(12) United States Patent
Wang et al.

(10) Patent No.: US 11,597,683 B2
(45) Date of Patent: Mar. 7, 2023

(54) METHOD FOR SULFUR REMOVAL FROM COAL FLY ASH

(71) Applicant: Wisconsin Alumni Research Foundation, Madison, WI (US)

(72) Inventors: Bu Wang, Madison, WI (US); Raghavendra Ragipani, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 479 days.

(21) Appl. No.: 16/871,508

(22) Filed: May 11, 2020

(65) Prior Publication Data

US 2021/0346838 A1  Nov. 11, 2021

(51) Int. Cl.
*C04B 18/10* (2006.01)
*C04B 18/08* (2006.01)
*C04B 20/02* (2006.01)

(52) U.S. Cl.
CPC ............ *C04B 18/106* (2013.01); *C04B 18/08* (2013.01); *C04B 18/088* (2013.01); *C04B 20/023* (2013.01)

(58) Field of Classification Search
CPC ..... C04B 18/062; C04B 18/106; C04B 18/08; C04B 18/088; C04B 20/023; C04B 2111/10; B01D 53/62; B01D 2257/504; Y02W 30/91
See application file for complete search history.

(56) References Cited

U.S. PATENT DOCUMENTS 7,641,878 B2 * 1/2010 Cochran ................. C04B 18/08
106/478

FOREIGN PATENT DOCUMENTS

| CN | 106622111 A | * | 5/2017 |
| CN | 108383406 A | * | 8/2018 |
| CN | 109652079 A | * | 4/2019 |
| CN | 110773114 A | * | 2/2020 |
| WO | WO-2007146513 A1 | * | 12/2007 |

OTHER PUBLICATIONS

Losey et al "Acidic Processing of Fly Ash: Chemical Characterization, Morphology, and Immersion Freezing", Environmental Science: Processes & Impacts, EM-ART-07-2018-000319.R2 (Year: 2018).*
American Road and Transportation Builders Association. The Economic Impacts of Prohibiting Coal Fly Ash Use in Transportation Infrastructure Construction. Transportation Development Foundation (TDF). 2011.
ASTM. Standard Specification for Coal Fly Ash and Raw or Calcined Natural Pozzolan for Use in Concrete. Annual Book of ASTM Standards. 2010. https://doi.org/10.1520/C0618-19.
Atadero, R.A., Riley, C.E., Van De Lindt, J.W., Heyliger, P.R. Cementitious spray dryer ash-tire fiber material for maximizing waste diversion. *Advances in Civil Engineering*. 2011. https://doi.org/10.1155/2011/354305.
Brogren, C., Karlsson, H.T. Modeling the absorption of SO2 in a spray scrubber using the penetration theory. *Chemical Engineering Science*. 1997. 52, 3085-3099. https://doi.org/10.1016/S0009-2509(97)00126-7.
Butalia, T., Wolfe, W., Amaya, P. The utilization of flue-gas desulfurization materials, Coal Combustion Products (CCPs): Characteristics, Utilization and Beneficiation. *Elsevier Ltd*. 2017. https://doi.org/10.1016/B978-0-08-100945-1.00006-X.
Carpenter, A.M. Low water FGD technologies. IEA Clean Coal Center. 2012.
Devilbiss, J., Ray, S. Sulfur dioxide emissions from U.S. power plants have fallen faster than coal generation [WWW Document]. EIA. 2017. URL https://www.eia.gov/todayinenergy/detail.php?id=29812.
Enders, M. The CaO distribution to mineral phases in a high calcium fly ash from eastern Germany. *Cement and Concrete Research*. 1996. 26, 243-251.
Fuller, E.C., Crist, R.H. The rate of oxidation of sulfite ions by oxygen. *Journal of the American Chemical Society*. 1941. 63, 1644-1650. https://doi.org/10.1021/ja01851a041.
Gerard, P., Segantini, G., Vanderschuren, J. Modeling of dilute sulfur dioxide absorption into calcium sulfite slurries. *Chemical Engineering Science*. 1996. 51, 3349-3358.
Harkness, J.S., Sulkin, B., Vengosh, A. Evidence for Coal Ash Ponds Leaking in the Southeastern United States. *Environmental Science & Technology*. 2016. 50, 6583-6592. https://doi.org/10.1021/acs.est.6b01727.
Hoff, S., Devilbiss, J. EIA electricity generator data show power industry response to EPA mercury limits [WWW Document]. 2016. URL https://www.eia.gov/todayinenergy/detail.php?id=26972. Accessed Feb. 21, 2020.
ICIS. US sulphuric acid import prices hit six-year highs. *ICIS Chemical Business*. 2018. 21.
Izquierdo, M., Querol, X. Leaching behaviour of elements from coal combustion fly ash: An overview. *International Journal of Coal Geology*. 2012. 94, 54-66. https://doi.org/10.1016/j.coal.2011.10.006.
Klett, M.G., Kuehn, N.J., Schoff, R.L., Vaysman, V., White, J.S. Power Plant Water Usage and Loss Study. The United States Department of Energy. 2007. https://doi.org/10.13130/RG/2/1/5024.6163.
Parkhurst, D.L., Appelo, C.A.J. Description of input and examples for PHREEQC version 3: a computer program for speciation, batch-reaction, one-dimensional transport, and inverse geochemical calculations, Techniques and Methods. 2013. Reston, VA. https://doi.org/10.3133/tm6A43.

(Continued)

*Primary Examiner* — Anthony J Green
(74) *Attorney, Agent, or Firm* — Joseph T. Leone; DeWitt LLP

(57) ABSTRACT

A method of reducing sulfur concentration in fly ash, flue gas desulfurization (FGD) ash, and mixtures thereof by contacting the fly ash, FGD ash, or mixtures thereof with an aqueous acidic solution, for a time, at a temperature, and at a liquid-to-solid ratio wherein the sulfur concentration within the fly ash, FGD ash, or mixture thereof is reduced to no more than 5 wt % $SO_3$ based on the total weight of dry fly ash, FGD ash, or mixture thereof so treated.

15 Claims, 8 Drawing Sheets

(56) References Cited

OTHER PUBLICATIONS

Ríos, A., González, M., Montes, C., Vásquez, J., Arellano, J. Assessing the effect of fly ash with a high SO3 content in hybrid alkaline fly ash pastes (HAFAPs). *Construction and Building Materials*. 2020. 238, 117776. https://doi.org/10.1016/j.conbuildmat.2019.17776.

Sarudi, I., Varga-Cseresnyés, E., Csapó-Kiss, Z., Szabó, A. Elimination of disturbing effect caused by sulphur dioxide for sulphur determination in wines by ICP-OES. *Analytical Letters*. 2001. 34, 449-455. https://doi.org/10.1081/AL-100102586.

Sharifi, N.P., Jewell, R.B., Duvallet, T., Oberlink, A., Robl, T., Mahboub, K.C., Ladwig, K.J. The utilization of sulfite-rich Spray Dryer Absorber Material in portland cement concrete. *Construction and Building Materials*. 2019. 213, 306-312. https://doi.org/10.1016/j.conbuildmat.2019.04.074.

Tseng, P.C., Rochelle, G.T. Dissolution Rate of Calcium Sulfite. *Environmental Progress*. 1986. 5.

United States Geological Survey. PHREEQC program and all supporting documentation. Accessed Apr. 15, 2020. www.usgs.gov/software/phreeqc-version-3.

* cited by examiner

METHOD FOR SULFUR REMOVAL FROM COAL FLY ASH

FEDERAL FUNDING STATEMENT

This invention was made with government support under DE-FE0031705 awarded by the Department of Energy. The government has certain rights in the invention.

BACKGROUND

The presence of sulfur in fly ash mixed with residues from dry and semi-dry flue gas desulfurization (FGD) units is a significant impediment to using fly ash as a supplementary cementitious material (SCM).

The volume of flue gas desulfurization (FGD) ashes produced by dry and semi-dry scrubbing systems increased substantially in the United States after implementation of the Mercury and Air Toxics Standards (40 CFR Part 63) in 2015 (DeVilbiss and Ray, 2017). See FIG. 1. Production year is shown on the X-axis. The left-hand Y-axis records FGD ash product in millions of tonnes (grey field). The right-hand Y-axis records percent utilization of fly ash (solid circles) and FGD ash (open diamonds). Dry and semi-dry scrubbing systems are preferred, especially in retrofitted power plants, owing to their lower installation cost and lower water consumption as compared to wet systems (Carpenter, 2012; Hoff and DeVilbiss, 2016). Production volume of the resulting dry-scrubbed FGD ash currently far exceeds commercial demand. As of early 2020, only about 20 wt % of FGD ash is used in a downstream product. The remaining approximately 80 wt % ends up in ash ponds and landfills. Again, see FIG. 1. Contamination of surface waters due to leaking ash ponds is a major concern (Harkness et al., 2016), along with the sheer cost of landfilling the FGD ash. Catastrophic failures of older coal ash impoundments, such as what happened in late 2008 at the Kingston Fossil Plant, also remain a concern. (On Monday Dec. 22, 2008, a dike ruptured at a coal ash pond at the Tennessee Valley Authority's Kingston Fossil Plant in Roane County, Tennessee, releasing 4.2 million cubic meters (1.1 billion U.S. gallons) of coal fly ash slurry. While no lives were immediately lost, the clean up effort took seven years and cost well in excess of $1 billion.)

Among dry and semi-dry FGD units in the United States, the most common ones are based on spray dryer absorber (SDA) technology. The spray-drying units are deployed upstream from particulate matter collection filters. As such, these power plants produce a mixed residue of FGD products and conventional fly ash (Carpenter, 2012; Sharifi et al., 2019). The high sulfur content in these residues is the primary reason for their poor utilization as compared to fly ash collected upstream to (i.e., prior to) FGD. Conventional coal fly ash is widely used as supplementary cementitious material (SCM) in the manufacture of concrete.

The primary sulfur-rich phase in the SDA/FGD ash is calcium sulfite hemihydrate ($CaSO_3 \cdot 0.5\ H_2O$). A small percentage of this sulfite-rich ash is currently used in mine reclamation and in soil conditioning. See Butalia et al., 2017. To decrease the amount of FGD ash going into landfills, there remains a long-felt and unmet need to render this high-sulfur content ash suitable for additional commercial uses. There remains an acute and unmet need to valorize FGD ash.

There are recent reports of using calcium sulfite hemihydrate-containing ashes as a replacement for Portland cement in concrete (Atadero et al., 2011; Sharifi et al., 2019). The results, though, are not encouraging: concrete made with high-sulfite fly ash has poor durability as compared to concrete made with Portland cement (Rios et al., 2020). In oxygenated aqueous environment sulfite ions gradually oxidize to sulfate (Fuller and Crist, 1941), which can react with calcium aluminates to form expansive sulfoaluminate. When used in concrete, these reactions are expected to occur over time, and long-term durability issues due to the slow-releasing sulfate remain a strong concern. In short, to date there has been little or no success in replacing Portland cement (in part or in full) with cements formulated using high-sulfur ashes.

There remains, however, a need to produce low-sulfur ash that complies with the ASTM C618 SCM standard (ASTM, 2010) at a cost that is not economically prohibitive.

SUMMARY

As noted above, the presence of sulfur in fly ash mixed with residues from dry and semi-dry flue gas desulfurization (FGD) units is a significant impediment for using fly ash as a supplementary cementitious material (SCM). Described herein is a process for selectively washing sulfur from mixed FGD ash so that it can be used as a SCM. Toward this end, batch dissolution experiments were conducted to establish the mixed FGD ash dissolution characteristics in neutral DI water and acidic aqueous solutions (e.g., nitric acid and carbonic acid). The stoichiometric acid and water requirement for sulfur washing has been estimated. FGD ash treated according to the method disclosed herein meets the ASTM C618 Class C/F standard for SCMs. Based on the experimental findings, described herein is a FGD ash washing process that yields ASTM C618-compliant ash and gypsum. Optionally, the process can also be used to capture carbon dioxide from flue gas. Preliminary estimates of input cost and water losses show that the washing process is optimally economically feasible using FGD ash with an $SO_3$ content up to 20 about wt %.

Key aspects of the process are to understand and harness the sulfur-leaching characteristics of sulfur-rich fly ash produced from dry and semi-dry FGD and the sulfur speciation in aqueous solution. Batch dissolution experiments were conducted on industrial SDA ash in de-ionized (DI) water, nitric acid, and carbonic acid. Carbonic acid was chosen with any eye toward recycling the acid back into the process. Based on the leachate analysis and wash residues, compliance of washed ashes with ASTM C618 standard was examined. As a working example, a process scheme using carbonic acid is disclosed based on the experimental findings and critically examined for water losses. The potential for carbon dioxide capture was determined.

Disclosed herein is a method of reducing sulfur concentration in fly ash, flue gas desulfurization (FGD) ash, and mixtures thereof. The method comprises contacting fly ash, FGD ash, or mixtures thereof with an aqueous acidic solution, for a time, at a temperature, and at a liquid-to-solid ratio wherein sulfur concentration within the fly ash, FGD ash, or mixture thereof is reduced to no more than 5 wt % $SO_3$ based on total weight of dry fly ash, FGD ash, or mixture thereof so contacted. This weight percent is conventionally measured using X-ray fluorescence.

In any version of the method, the method may comprise contacting the fly ash, FGD ash, or mixtures thereof with the aqueous, acidic solution at a liquid-to-solid ratio of no more than 2 liters aqueous, acidic solution per gram of fly ash, FGD ash, or mixture thereof, or no more than 1 liter aqueous, acidic solution per gram of fly ash, FGD ash, or mixture thereof, or no more than 100 mL aqueous, acidic solution per gram of fly ash, FGD ash, or mixture thereof, or no more than 50 mL aqueous, acidic solution per gram of fly ash, FGD ash, or mixture thereof, or no more than 25 mL aqueous, acidic solution per gram of fly ash, FGD ash, or mixture thereof.

In any version of the method, the pH of the aqueous, acidic solution may be from about 2.0 to about 6.5, from about 4.0 to about 6.0, or from about 4.0 to about 5.0. The aqueous acidic solution may comprise carbonic acid. The carbonic acid solution may be made by contacting the fly ash, FGD ash, or mixture thereof with water in the presence of a gas phase comprising a partial pressure of carbon dioxide of from about 0.12 atm to about 10 atm or from about 1 atm to about 5 atm.

In other versions of the method, the aqueous acidic solution comprises a mineral acid. It is preferred, although not required, that the mineral acid is selected from the group consisting of hydrochloric acid (HCl), nitric acid ($HNO_3$), phosphoric acid ($H_3PO_4$), sulfuric acid ($H_2SO_4$), boric acid ($H_3BO_3$), hydrofluoric acid (HF), hydrobromic acid (HBr), and perchloric acid ($HClO_4$).

In another version of the method, the fly ash, FGD ash, or mixture thereof is contacted with the aqueous acidic solution at a liquid-to-solid ratio wherein the hydrogen ion concentration ([$H^+$]) in the aqueous acidic solution is at least 1.95 mmol [$H^+$] per mmol of sulfur to be washed.

Numerical ranges as used herein are intended to include every number and subset of numbers contained within that range, whether specifically disclosed or not. Further, these numerical ranges should be construed as providing support for a claim directed to any number or subset of numbers in that range. For example, a disclosure of from 1 to 10 should be construed as supporting a range of from 2 to 8, from 3 to 7, from 1 to 9, from 3.6 to 4.6, from 3.5 to 9.9, and so forth.

All references to singular characteristics or limitations of the present invention shall include the corresponding plural characteristic or limitation, and vice-versa, unless otherwise specified or clearly implied to the contrary by the context in which the reference is made. The indefinite articles "a" and "an" mean "one or more" unless explicitly stated to the contrary.

All combinations of method or process steps as used herein can be performed in any order, unless otherwise specified or clearly implied to the contrary by the context in which the referenced combination is made.

The methods disclosed herein can comprise, consist of, or consist essentially of the essential elements and limitations described herein, as well as any additional or optional ingredients, components, or limitations described herein or otherwise useful in handing wet or dry particulate waste matter.

DETAILED DESCRIPTION

Abbreviations and Definitions

Figure 1:
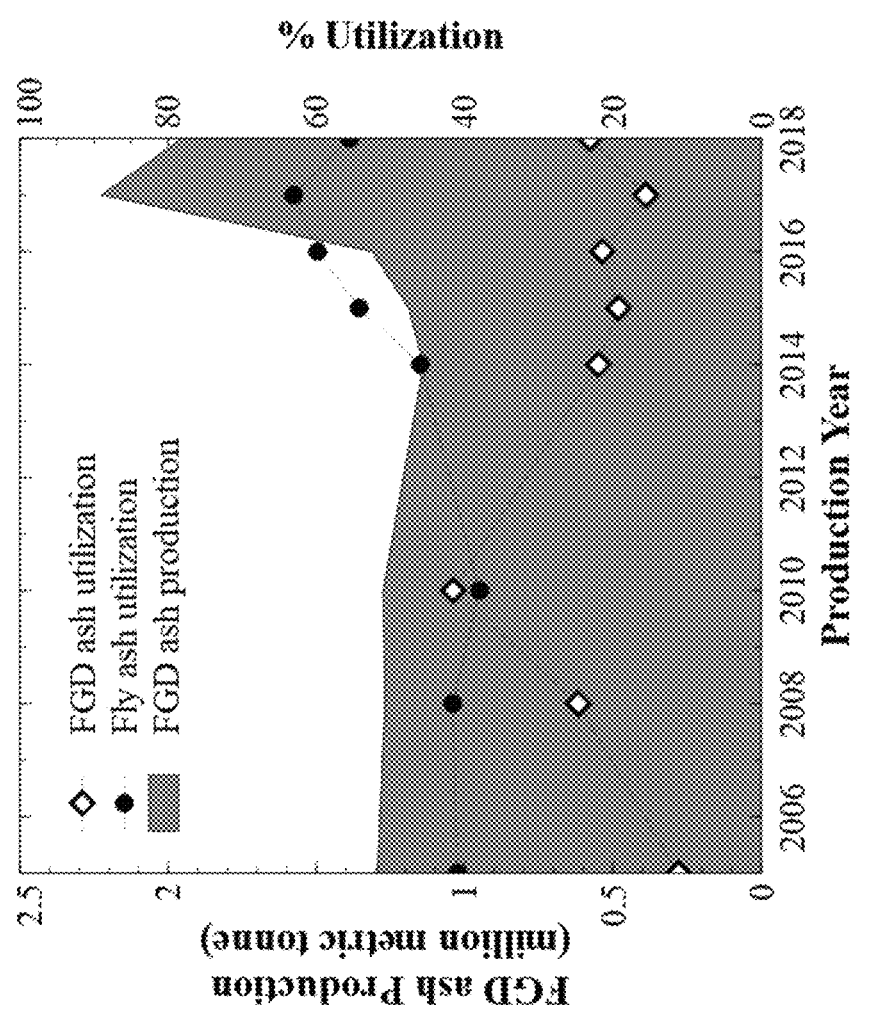
FIG. 1 is a graph showing annual worldwide production of FGD ash (in millions of metric tons; grey field) and FGD ash utilization (◇) and fly ash utilization (●) as a percent of the total produced.

ASTM=The former American Society for Testing and Materials, now known as ASTM International, West Conshohocken, Pa., USA.
DI=de-ionized.
FGD=flue gas desulfurization.
ICIS=Independent Commodity Intelligence Services, New York City, N.Y. USA; www.icis.com).
ICP=inductively coupled spectroscopy. ICP-OES=inductively coupled plasma optical emission spectrometry.
LOI=loss on ignition.
L/S=liquid/solid ratio.
MATS=U.S. Mercury and Air Toxics Standards, 40 CFR Part 63.
Mineral acid=any acid derived from one or more inorganic compounds. A non-exclusive list of mineral acids that can be used in the present process include (but are not limited to) hydrochloric acid (HCl), nitric acid ($HNO_3$), phosphoric acid ($H_3PO_4$), sulfuric acid ($H_2SO_4$), boric acid ($H_3BO_3$), hydrofluoric acid (HF), hydrobromic acid (HBr), perchloric acid ($HClO_4$), and the like.
Hydroiodic acid HI
SCM=supplementary cementitious material.
SDA=spray dryer absorber.
TGA=thermogravimetric analysis.
Tonne=metric ton=1,000 kg=1 Mg.
Materials and Methods:
Sulfur-rich FGD ash was generously provided by Weston Generating Station, Marathon County, Wisconsin, United States. The ash was generated from a semi-dry desulfurization technology, spray dryer absorber (SDA), which was commissioned upstream to pulse-jet filter. This arrangement thus isolates and collects a mixed residue of fly ash and FGD products. The raw ash was characterized using X-ray fluorescence (XRF) spectroscopy (for elemental composition) and X-ray diffraction (XRD) for mineral phase makeup.

Four sets of dissolution experiments were conducted:
1) Batch dissolution of the ash in DI water;
2) Batch dissolution of the ash in dilute aqueous nitric acid;
3) Titration of ash slurry using aqueous nitric acid; and
4) Batch dissolution under 1 to 5 atm of partial pressure of $CO_2$.

A typical batch dissolution experiment involved charging a predetermined quantity of FGD ash (measured to the accuracy of 0.001 g) into a 250 mL glass bottle containing DI water (conductivity <1 μS/cm and measured to the accuracy of 0.5%) and stirred at 400±20 rpm on a hot-plate magnetic stirrer. The liquid-to-solid (L/S) ratio was varied in the range of from 25 to 2000 mL/g. The reaction temperature was maintained at 23±2° C. Slurry pH was measured using an Orion Ross™-brand glass electrode and a Thermo Scientific Orion Star pH meter (both obtained commercially from ThermoFisher Scientific, Waltham, Mass., USA) that was regularly calibrated with pH 4 and pH 10 buffers (slope within 99-100%). Each experiment was repeated at least twice, with at least one experiment without the pH probe to avoid KCl contamination due to the electrode and to measure potassium concentration in the leachate. Experiments under carbon dioxide environment (1-5 atm) were conducted in a 50 mL benchtop Parr reactor (Parr Instrument Company, Moline, Ill., USA). For each batch experiment, 25 mL of deionized water was first added to the reactor and charged with ash to achieve a slurry with L/S of 25 mL/g to 100 mL/g. The slurry was stirred for 30 s to avoid agglomeration of the ash. Following this, without stirring, the air in the reactor was evacuated and replaced with 100% $CO_2$ (×3). The reactor was then finally charged with $CO_2$ and maintained at the desired $CO_2$ pressure. Subsequently, dissolution was started by stirring the slurry at 800±10 rpm. The liquid sample was collected at the end of reaction, after depressurizing the reactor.

Acid titration of the ash slurry was carried out using a Hanna 901C auto-titrator (Hanna Instruments, Smithfield, R.I., USA), with standardized 1.0 M nitric acid as the titrant, and the initial L/S ratio was 25 mL/g. A linear dosing titration was carried out with 0.05 mL every 5 seconds until the slurry pH was reduced to 3.0. Intermittent liquid sampling was carried out for analysis.

During each batch experiment and titration study, the liquid sample was collected by filtering the slurry using a 0.2 μm syringe filter. An in-sample oxidation procedure of leachate was necessary to oxidize sulfite to sulfate and consequently avoid the formation of sulfur dioxide upon acidification to a pH≤2 for ICP analysis. Without oxidation, a positive error in concentration measurement with significant variance was noticed, possibly due to higher nebulization of volatile dissolved gases into the ICP chamber (Sarudi et al., 2001). The in-sample oxidation procedure involved adding 0.03 wt. % $H_2O_2$ in 1 mM $HNO_3$ solution to collected liquid samples in a 1:1 volume ratio. Partial acidification was necessary for instantaneous oxidation. Subsequently, the oxidized sample was diluted and acidified using 0.5 M $HNO_3$ to match the ICP standards. Elemental concentrations (Ca, Fe, Mg, Al, Si, S, Na, and K) in the leachate were measured using ICP-OES after calibrating with certified standards procured commercially from Millipore-Sigma (St. Louis, Mo., USA) and High-Purity Standards (North Charleston, S.C., USA). The leached residues were collected from reaction slurry after vacuum filtration on a quantitative (1 μm retention) filter paper and dried overnight. Loss on ignition (LOI) was measured as weight loss of ash from thermogravimetric analysis (TGA) in zero-air environment at 1000° C.

A geochemical model was built using the PHREEQC v3 program (Parkhurst and Appelo, 2013) with the wateq4f thermodynamic database. (As of Apr. 15, 2020, the PHREEQC program and all supporting documentation can be downloaded free of charge from the United States Geological Survey at www.usgs.gov/software/phreeqc-version-3.) The model was used to determine the solubility controlling mineral phases and the transport of elements due to washing. Model results are compared with the experimental data. Stoichiometric acid moles and water requirements determined from the titration and batch dissolution experiments were used to simulate washing requirements to meet the ASTM C618 standard (5% $SO_3$) under the $CO_2$ environment and compared with experimental results.

Figure 2:
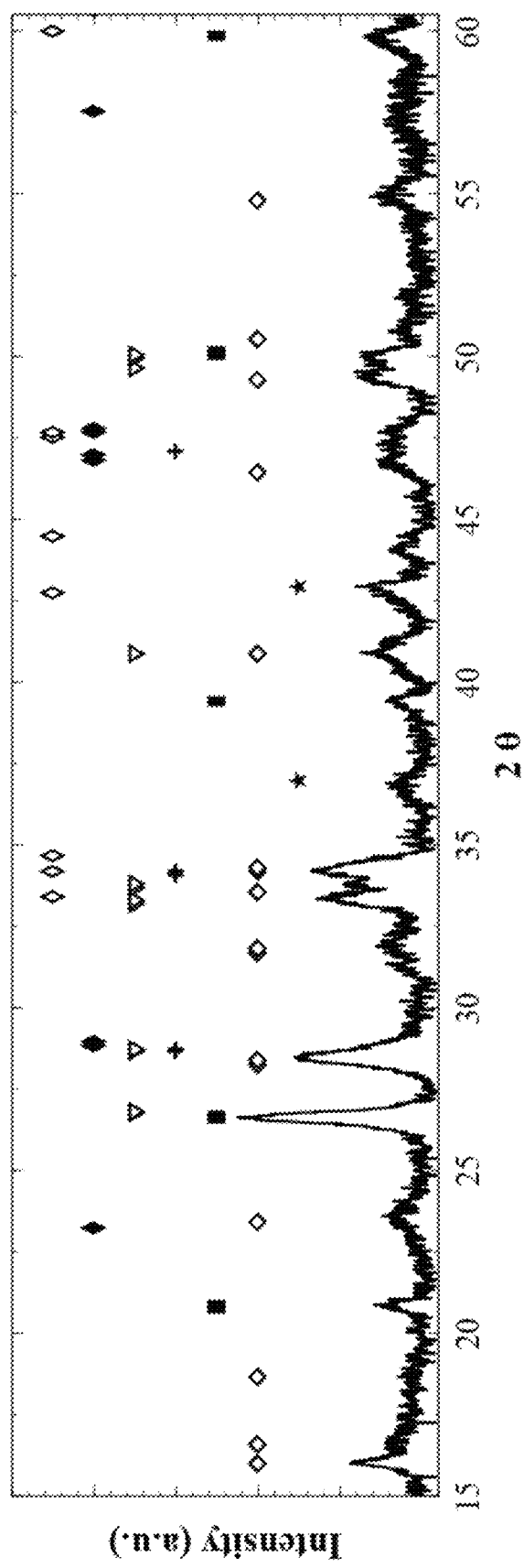
FIG. 2 is an X-ray diffraction pattern of raw FGD ash showing crystalline mineral phases: calcium sulfite hemihydrate (◇), magnesia (★), quartz (▮), tricalcium aluminate (∇), portlandite (+), calcite (♦), magnetite (◊)

Ash Characterization:

The elemental composition of the raw ash is shown in Table 1. The mineral phase composition of the raw ash is shown in FIG. 2. FIG. 2 is an X-ray diffraction pattern of the raw FGD ash showing crystalline mineral phases: calcium sulfite hemihydrate (◊), magnesia (★), quartz (▌), tricalcium aluminate (▽), Portlandite (+), calcite (♦), and magnetite (◇). The analyses confirm high-sulfur content (10.44 wt. % as $SO_3$) in the form of calcium sulfite hemihydrate ($CaSO_3.0.5\ H_2O$), which makes it non-compliant with the ASTM C618 standard (maximum permissible sulfur content is 5.0% as $SO_3$ wt. % per the standard). Calcium content as CaO in the ash was ~26 wt. %, which makes it suitable for a Class C SCM. Of the total calcium in the ash, it is estimated that ~30% of it is associated with calcium sulfite hemihydrate. Other Ca-rich minerals include tricalcium aluminate along with traces of calcium carbonate and portlandite.

TABLE 1

Chemical composition (wt. %) of ash sample determined using X-ray fluorescence (XRF)

| Oxide | CaO | $SiO_2$ | $Al_2O_3$ | $SO_3$ | $Fe_2O_3$ | MgO | $TiO_2$ | $Na_2O$ | $P_2O_5$ | $K_2O$ | BaO | SrO | Total |
|---|---|---|---|---|---|---|---|---|---|---|---|---|---|
| FGD ASH | 25.9 | 31.8 | 15.6 | 10.44 | 4.94 | 3.95 | 1.08 | 0.97 | 0.75 | 0.53 | 0.45 | 0.24 | 96.64 |

It is generally agreed that the sulfur-rich mineral phases are accumulated on the surface of the fly ash, and the grain size of these phases are expected to be smaller than those phases associated with fly ash (Enders, 1996; Izquierdo and Querol, 2012). The sulfur leaching characteristics determined by testing disclosed herein leads to a process scheme to reduce the sulfur content of the ash (and optionally to capture $CO_2$ at the same time).

Figures 3A, 3B:
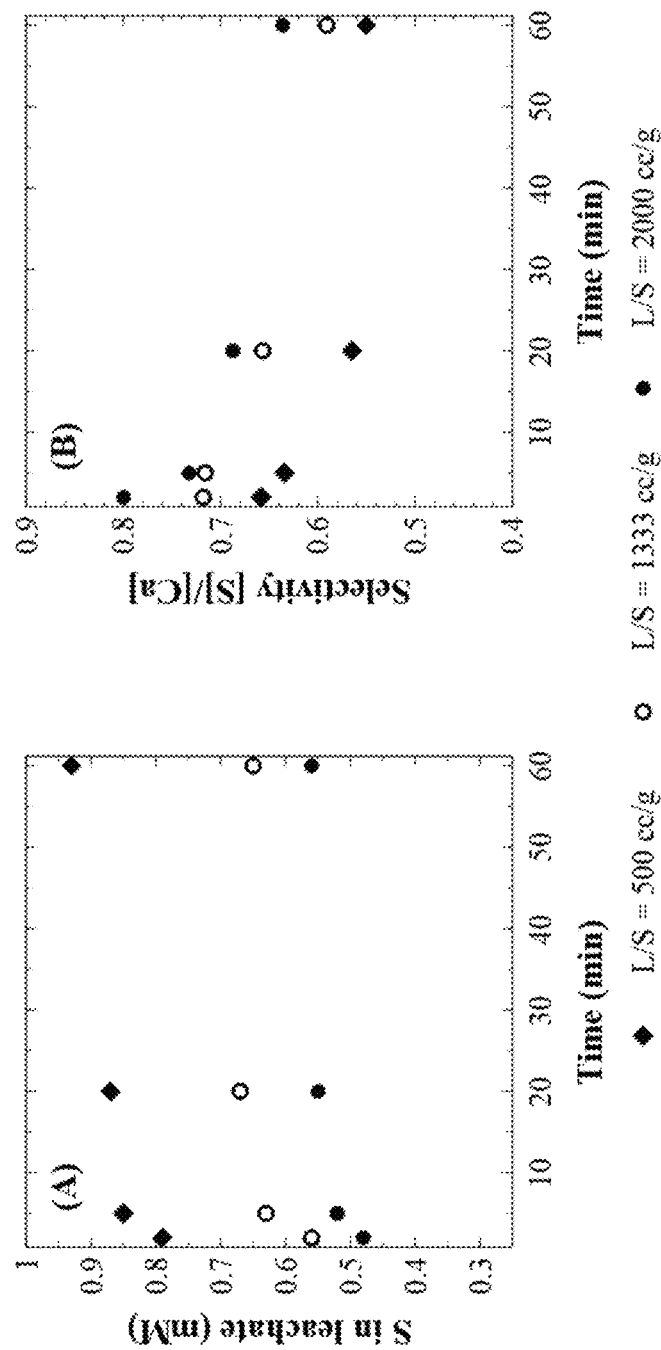
FIG. 3A is a graph showing the concentration of sulfur in the leachate versus dissolution time.
FIG. 3B is a graph depicting the corresponding selectivity as the molar ratio of sulfur and calcium in the leachate.

Sulfur Extraction Kinetics:

Dissolution experiments were performed in DI water to understand the rate of sulfur release from the ash and its selectivity. FIG. 3A is a graph showing the concentration of sulfur in the leachate as a function of dissolution time. FIG. 3B is a graphing showing the corresponding selectivity for sulfur as a molar ratio of sulfur and calcium in leachate. Both graphs used DI as the liquid phase. Here, selectivity is defined as the molar ratio of sulfur to calcium in the leachate, which demonstrates the relative extents of dissolution of the calcium sulfite hemihydrate and tricalcium aluminate phases. These are the two main phases as shown in FIG. 2 that contain calcium. The extraction kinetics suggests a rapid initial release followed by a plateau in concentration vs. time. Also, the relative release of sulfur was found to decrease with time, suggesting a relative increase in the rate of tricalcium dissolution with time. These results are due to higher sulfur content on the surface ash, which preferentially leaches from the surface of the ash until it reaches its saturation concentration in the liquid phase. The relative extraction of tricalcium aluminate is lower due to it being embedded within the matrix of the ash particle. In view of retaining tricalcium aluminate in the leached residue, a relatively short dissolution time, five minutes, was used for further studies of selective sulfur removal in a batch dissolution experiment.

Effect of L/S Ratio on Sulfur Extraction Characteristics in DI Water:

A series of experiments were run using a five-minute dissolution time and using various L/S ratios of the DI water and FGD ash. The leachates were then subjected to elemental analysis (ICP, ICP-OES) to determine the concentrations of selected elements within the leachate. The concentration of various elements (in $mg/dm^3 = g/m^3$) in the leachate released within the first five minutes of the batch dissolution experiments at various L/S ratios is shown in Table 2. As shown in the table, Ca and S are the main elements in the leachate, both when DI is used as the liquid phase and at all the $CO_2$ pressures tested.

From FIGS. 3A, 3B, and Table 2, where the effect of L/S on selectivity and leachate concentrations are shown, it is clear that the sulfite phase dissolution selectivity improves with a decrease in leachate pH, which in turn was a consequence of increasing L/S ratio. Thus, it appears that high L/S and acidic conditions favor the selective washing process. Also, in DI water the concentration of Al in the leachate was found to decrease at lower leachate pH, especially in the near-neutral pH range, where the solubility of aluminum hydroxide is the lowest. The observed selectivity behavior can be attributed to enhanced solubility of calcium sulfite hemihydrate vis-à-vis tricalcium aluminate leaching kinetics with decreasing pH and complete solubility of trace mineral phases such as calcite and portlandite at low L/S. This is corroborated by the estimated supersaturation with respect to calcium sulfite hemihydrate, as shown by the saturation indices in Table 2. The calcium sulfite hemihydrate phase rapidly dissolves to saturate the solution, and subsequent leaching of other calcium-rich phases supersaturates it.

TABLE 2

Effect of L/S (mL/g) on concentration ($mg/dm^3$) of major elements released from FGD ASH into the leachate at 23 ± 2° C.

| L/S | Ca | Si | Mg | Al | Fe | Na | K | S | pH† | $SI_{Hh}$ |
|---|---|---|---|---|---|---|---|---|---|---|
| Deionized water | | | | | | | | | | |
| 25 | 219.22 | 0.66 | 0.27 | 41.32 | n.d. | 6.29 | 3.82 | 94.29 | 11.24 | 1.31 |
| 200 | 81.94 | 1.21 | 0.58 | 9.35 | n.d. | 2.49 | 0.24 | 40.25 | 10.91 | 0.67 |
| 500 | 54.05 | 0.82 | 0.39 | 4.53 | n.d. | 2.24 | 0.25 | 25.06 | 10.70 | 0.33 |
| 1333.3 | 35.66 | 0.54 | 0.19 | 1.98 | n.d. | 1.89 | 0.17 | 19.03 | 10.43 | 0.08 |
| 2000 | 28.00 | 0.48 | 0.15 | 1.39 | n.d. | 1.84 | 0.16 | 15.12 | 10.35 | −0.1 |
| 100% $CO_2$ – 1 atm abs. pressure | | | | | | | | | | |
| 25 | 683.1 | 18.8 | 35.1 | 0.4 | n.d. | 13.8 | 11.4 | 252.0 | 6.15 | 1.15 |
| 50 | 501.3 | 12.6 | 31.9 | 0.6 | n.d. | 9.3 | 10.5 | 199.6 | 6.03 | 0.86 |
| 100 | 431.5 | 9.7 | 65.5 | 6.1 | n.d. | 12.5 | 10.3 | 248.0 | 5.99 | 0.86 |
| 100% $CO_2$ – 2.5 atm abs. pressure | | | | | | | | | | |
| 25 | 771.8 | 20.2 | 34.4 | 1.4 | n.d. | 21.1 | 20.4 | 287.8 | 5.81 | 0.94 |
| 100% $CO_2$ – 5 atm abs. pressure | | | | | | | | | | |
| 25 | 924.7 | 26.9 | 44.5 | 2.5 | n.d. | 21.8 | 20.7 | 395.7 | 5.52 | 0.89 | n.d.-not detected/concentration lower than detection limit (0.1 $mg/dm^3$)
†pH for samples under the $CO_2$ environment was estimated using PHREEQC assuming $CO_2$ saturation and are not experimentally measured values.
$SI_{Hh}$ is the saturation index defined as the logarithm of the ratio of ionic activity product and solubility product and estimated using the PHREEQC program.

Figures 4A, 4B, 4C:
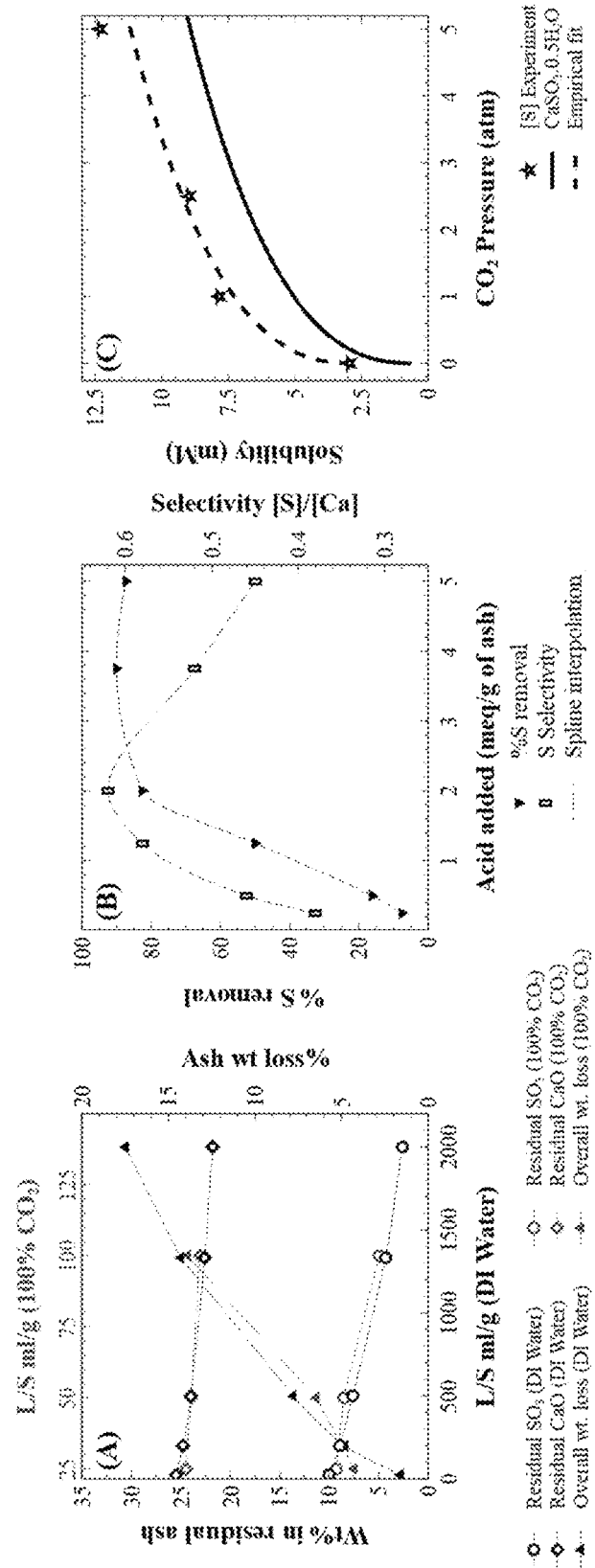
FIG. 4A is a graph showing the effect of L/S on weight loss and chemical composition due to washing in DI water and 1 atm $CO_2$; the red data points correspond to the X-axis.
FIG. 4B is a graph depicting the effect of acid addition on sulfur removal from the ash at L/S of 25 mL/g.
FIG. 4C is a graph depicting the experimentally determined influence of $CO_2$ pressure on the solubility of sulfur from SDA ash and simulated solubility curves assuming saturation of $CaSO_3 \cdot 0.5 H_2O$.

The residual mass and composition of the leached ash was estimated by mass balance. The weight of the residual ash after treating with DI water vs L/S ratio are shown in FIG. 4A; the weight percent of sulfur removed with added acid are shown in FIG. 4B, left Y-axis, with selectivity to sulfur shown on the right Y-axis; the results for solubility of $CaSO_3 \cdot 0.5\ H_2O$ as a function of $CO_2$ pressure are shown in FIG. 4C. The water requirement for reducing the $SO_3$ concentration below 5.0 wt. % in the washed ash is estimated to be 1300 mL/g of ash. The corresponding weight loss was estimated to be about 15 wt. %. The method thus enables using 85 wt. % of the landfilled ash, which otherwise would be landfilled due to its high sulfur content. As shown in Table 3, the washed ash composition is compliant with the ASTM C618 standard.

While this outcome is promising, a huge volume of water is required per unit mass of ash. This makes the process using water alone difficult from a regulatory standpoint (if not a cost standpoint). Regulatory agencies such as the U.S. Environmental Protection Agency have strenuous permitting requirements for any industrial process that uses large volumes of water. Therefore, methods were tested to enhance sulfur solubility (selectively) by acidifying the liquid phase.

Sulfur Extraction Characteristics in Acid Media:

Acid titration using 1.0 N $HNO_3$ was carried out on ash slurry at initial L/S ratio of 25 mL/g to determine the acid requirement and resulting sulfur selectivity. FIG. 4B shows the experimental extent of sulfur removal and the corresponding sulfur selectivity. Until the point of complete sulfur removal, the sulfur selectivity increases with acid addition. Thus, the data shown in FIG. 4B demonstrate that the calcium sulfite hemihydrate phase is preferentially/selectively dissolved under acidic conditions. The acid requirement for washing to achieve 5.0 wt. % $SO_3$ in the residue at L/S of 25 mL/g was determined to be at least 1.425 mmol/g of ash; the corresponding slurry pH was 4.64. The stoichiometric requirement of acid is estimated to be 1.95 meq/mmole of sulfur released.

Figure 5C:
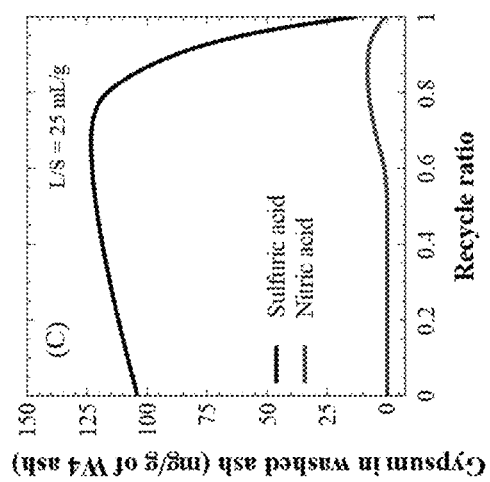
FIG. 5C is a graph showing the effect of recycle ratio on the amount of gypsum precipitated as a contaminant in the washed ash.
Figure 5B:
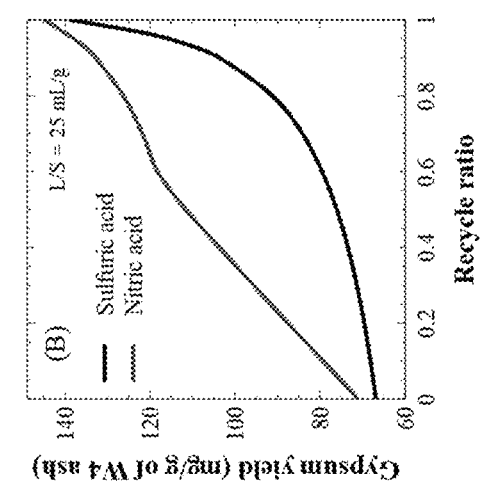
FIG. 5B is a graph showing the effect of recycle ratio on overall gypsum yield as a ratio of washed ash.
Figure 5A:
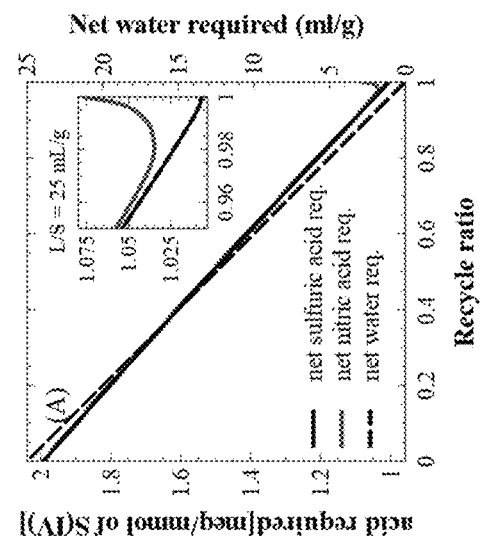
FIG. 5A is a graph showing the effect of recycle ratio on the net acid required and the wastewater generated for nitric acid and sulfuric acid-based washing solutions.

Recycling of Washing Solution:

To further reduce the water and acid losses, optimal recycling of washing solution was investigated through process simulation studies. Simulations were performed for two washing solutions, nitric and sulfuric acids, where the anion in the latter solution reacts with leached calcium to precipitate sparingly soluble gypsum. In simulation studies, recycle ratio—defined as the ratio of recycle flow rate to overall volumetric flow rate of washing solution into the ash washing unit—was varied to study its effect on various process performance indicators such as net acid required, net water required/wastewater generated, overall gypsum production, and extent of gypsum contamination in washed ash. The results are shown in FIG. 5. The findings from FIG. 5A suggest that, at L/S of 25 mL/g, 98% and 100% recycle is optimal for nitric acid and sulfuric acid washing solutions, respectively; the corresponding wastewater generation rates are 0.5 mL/g and 0 mL/g, respectively. The net acid requirement for nitric acid and sulfuric acid washing solutions are 1.035 and 1.007 meq/mmol of S(IV) washed, respectively, which is about 50% lower than that consumed without any recycling. The gypsum yield is higher in nitric acid-based washing solution compared to that of sulfuric acid. As recycle ratio approaches 1, the gypsum yield is comparable for both acids (see FIG. 5B). Sulfuric acid-based washing solution is promising but for higher gypsum in the washed ash. At 100% recycle of sulfuric acid washing solution, the gypsum contamination is ~13 mg/g of ash (see FIG. 5C). The contribution of $SO_3$ content in the washed ash from Gypsum is estimated to be about 0.9 wt % (as $SO_3$), which still meets the 5.0 wt % upper limit set for SCM in ASTM C618.

At a competitive price of $90-100 per tonne of sulfuric acid (ICIS, 2018), the putative cost of acid for washing FGD ASH is roughly US $7.10 to $7.90 per tonne of washed ash without recycling washing solution (US $3.70 to $4.10 per tonne of washed ash with optimal recycling of washing solution). See FIG. 6. For FIG. 6, sulfuric acid was priced at $100/tonne without recycling of washing solution. The resulting costs are normalized to the quantity of washed ash. The resulting de-sulfurized ash sells wholesale for about $100 per metric tonne for use in making concrete (which typically costs 17% less than Portland cement) (American Road and Transportation Builders Association, 2011).

TABLE 3

Chemical composition (in wt. %) of raw ash and washed ashes and compliance with ASTM C618 standard

| Element/phase | Raw Ash | 100% S removal[‡] estimate | DI Water | Acid washing Experimental | Sat. $CO_2$ washing | ASTM C618 Standard |
|---|---|---|---|---|---|---|
| CaO | 25.9 | 22.8 | 22.6 | 21.7 | 23.1 | ≥18.0 |
| $SO_3$ | 10.44 | 0 | 4.3 | 5.0 | 4.9 | ≤5.0 |
| $SiO_2$ + $Al_2O_3$ + $Fe_2O_3$ | 52.3 | 64.1 | 60.3 | 60.7 | 60.2 | ≥50.0 |
| LOI | — | — | — | — | — | ≤6.0 |

[‡]For an elementary estimate, it is assumed that all S is present as $CaSO_3$, and its leaching is 100% selective.

Figure 6:
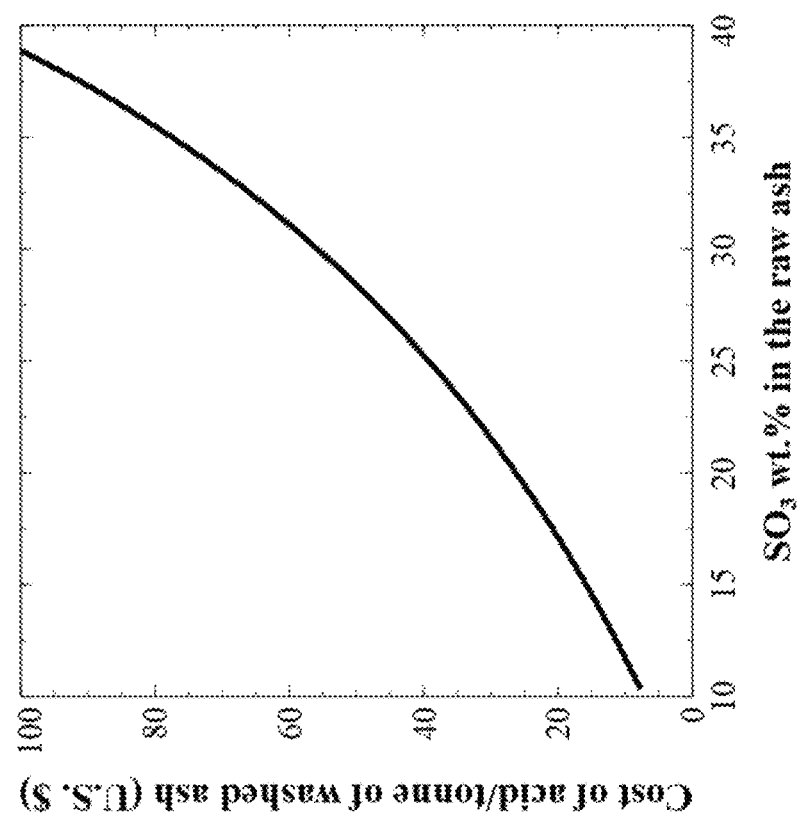
FIG. 6 is a graph depicting the preliminary estimate for the cost of acid washing of ashes of various $SO_3$ content to meet the ASTM C618 standard without recycling of washing solution and using sulfuric acid valued at $100/tonne (i.e., "metric ton"=1,000 kg=1 Mg); costs are normalized to the quantity of washed ash.

Preliminary estimates, shown in FIG. 6, demonstrate that significant value addition is possible for moderate sulfur ashes (below 20 wt. % $SO_3$) by acid washing. Oxidation of sulfite to sulfate and subsequent precipitation of gypsum by evaporation or spray drying will attract additional cost.

Figure 7A:
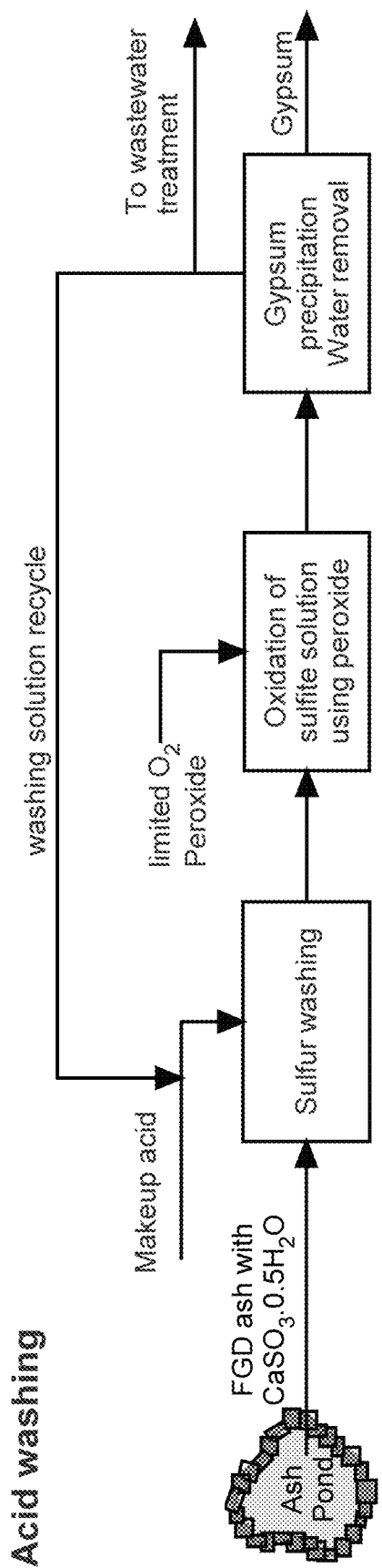
FIG. 7A is a block diagram for acid washing according to the present method using mineral acid.
Figure 7B:
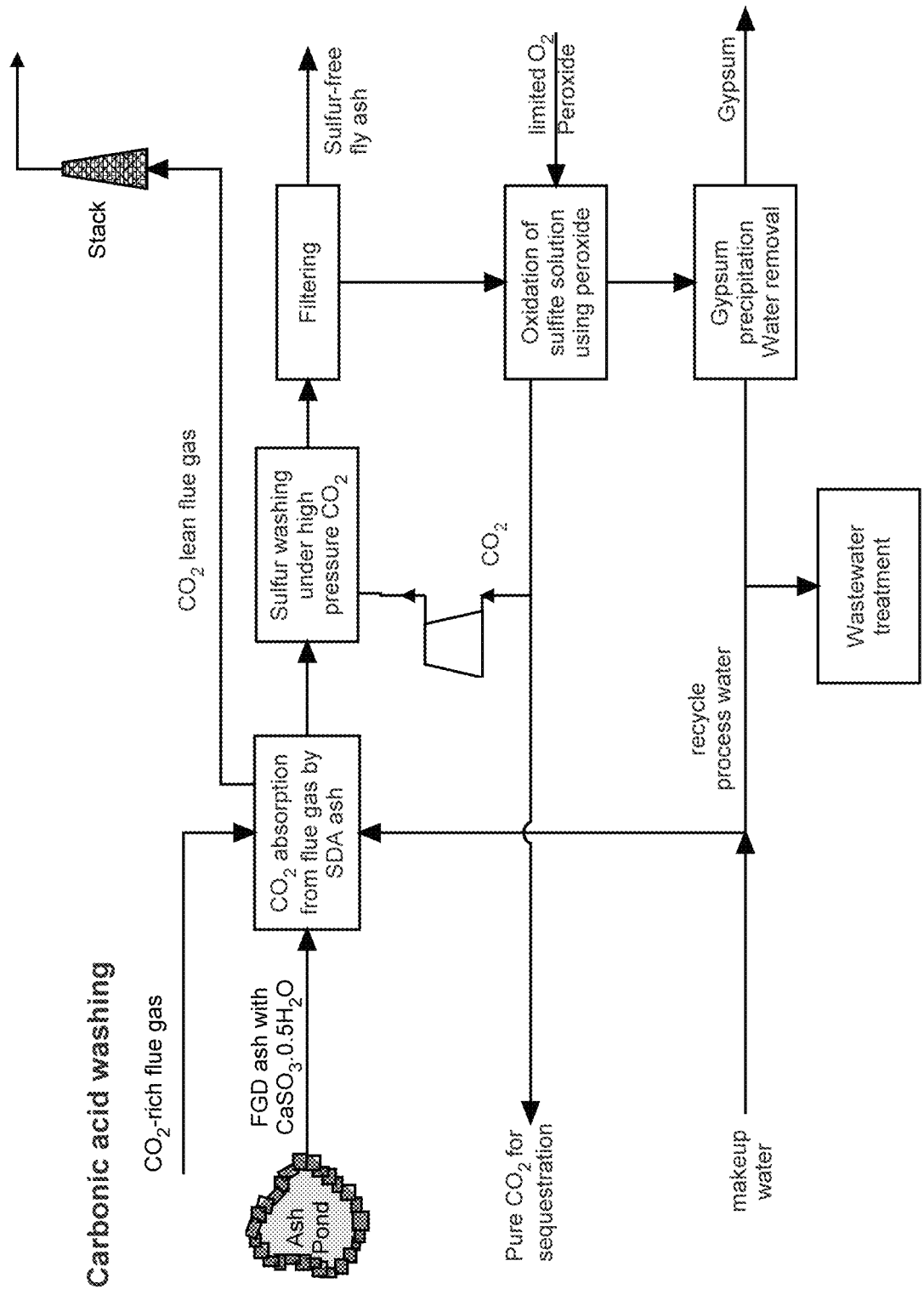
FIG. 7B is a block diagram for two-stage sulfur washing and carbon dioxide capture according to the present method.

A first version of the process based on mineral acid washing is shown in FIG. 7A. A second version of the process based on $CO_2$/carbonic acid washing is shown in FIG. 7B. Although mineral acid washing appears attractive, in view of identifying a recyclable acidic source to reduce the input cost further, ash washing using an aqueous solution saturated with $CO_2$ was explored. Such a process allows pure carbon dioxide capture from a dilute flue gas stream and gypsum production from the leachate. First, the effect of L/S (25-100 mL/g) and pressure (1-5 atm) under a 100% $CO_2$ atmosphere were studied. As shown in FIG. 4A, the effect of L/S has similar characteristics on residual slag in both pure DI water and $CO_2$ environment. The same extents of sulfur washing in both approaches resulted in similar chemical composition and weight loss. To achieve 5.0 wt. % residual sulfur under a 1 atm $CO_2$ environment, the L/S ratio was estimated to be about 100 mL/g ash. This is a substantially smaller water requirement (~13 times smaller than DI water washing per unit mass of ash). As shown in Table 2, the concentration of sulfur in the leachate is invariant when L/S changed from 25 to 100 mL/g under 1 atm $CO_2$ pressure. These results suggest that the release of sulfur into the solution is limited by solubility. To further improve the sulfur solubility, the influence of $CO_2$ pressure on the release of sulfur was studied. The results are shown in FIG. 4C. An increase in the $CO_2$ pressure from 1 atm to 5 atm increased the sulfur solubility by about 57%. Under these conditions, the water requirement was vastly reduced, to approximately 50 mL/g ash.

Process Scheme for Sulfur-Washing Using Carbon Dioxide:

The block diagram for the proposed combined processes of sulfur washing and carbon dioxide capture is illustrated in FIG. 7B. The first stage involves absorbing carbon dioxide from flue gas into FGD ash slurry to partially dissolve the sulfite phase. In the following stage, sulfur washing is carried out using pressurized carbon dioxide (up to 5 atm) to overcome the low solubility of calcium sulfite hemihydrate in aqueous solution. The low-sulfur residual fly ash is filtered at this stage. The sulfur-rich aqueous stream may optionally be oxidized by peroxide addition, which acidifies the solution and leads to spontaneous desorption of carbon dioxide. The desorbed carbon dioxide is partially compressed and recycled to the sulfur-washing step. The rest is available for $CO_2$ sequestration or utilization. To reduce peroxide consumption, a limited amount of oxygen gas can be provided. The oxygen supplied should be less than the stoichiometric requirement, to avoid contaminating the $CO_2$ to be recycled. The choice of using a combination of 02 gas and peroxide is principally economic, based on the cost of 02 and peroxide.

The sulfate solution, which is also rich in calcium, may be concentrated either by evaporating or recycling for subsequent precipitation as gypsum; if required, calcium hydroxide may optionally be added at this stage to maximize gypsum precipitation. The process water recovered is recycled to the $CO_2$ absorber in the first step or sent to wastewater treatment. The pH of the oxidized liquid stream is expected to be in the range of 3-4. Recycling this stream back into the process will lower the water requirement as compared to a single pass system.

$CO_2$ Capture Capacity from Flue Gas:

$CO_2$ capture from flue gas, which was described as the first stage in the proposed process description, is predicted based on the absorbed $CO_2$ and alkalinity of the leachate, defined as the molar equivalents of bicarbonate ion concentration in the leachate. While the contribution of physically absorbed $CO_2$ is estimated using Henry's law, the estimation of alkalinity requires the experimental knowledge of all the cations and anions in the solution. A conservative estimate of alkalinity can be obtained based on the solubility of $CaSO_3 \cdot 0.5\ H_2O$ phase and neglecting the calcium release from other phases. As shown in the below balanced chemical reaction, the concentration of bicarbonate ions in the solution would be equal to that of sulfite ion concentration, which can be estimated using solubility curve for $CaSO_3 \cdot 0.5\ H_2O$.

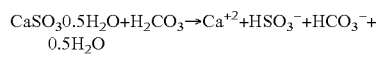

$$CaSO_3 \cdot 0.5H_2O + H_2CO_3 \rightarrow Ca^{+2} + HSO_3^- + HCO_3^- + 0.5H_2O$$

As shown in FIG. 4C, the solubility data predicted based on thermodynamic data for pure $CaSO_3 \cdot 0.5\ H_2O$ phase underestimates the experimentally determined sulfur concentration. An empirical fit with experimental data can be obtained when the solubility curve is shifted by a constant value to match the experimentally determined sulfur solubility in DI water ($P_{CO2}=0$ atm). Based on the empirical fit for the solubility curve, the sulfur release into aqueous solution saturated with the flue gas (12 vol % $CO_2$) at a L/S ratio of 50 mL/g ash is estimated to be 3.25 mM; corresponding absorbed $CO_2$, and bicarbonate ion concentrations are 4.07 and 3.25 mM, respectively. The corresponding $CO_2$ capture potential is estimated to be 16.1 kg/tonne of ash. Because the total dissolved inorganic carbon is only 7.32 mM, any significant $CO_2$ capture per tonne of ash is possible only at higher L/S values.

Critical Analysis of Water Intensity:

A preliminary analysis was carried out to examine the water requirement for the proposed process vis-à-vis wet FGD technology deployed in a 500 MW supercritical power plant. This comparison is to understand the water intensity of the process disclosed herein with a known benchmark (wet FGD process). The design basis for wet FGD technology is based on the work by the U.S. Department of Energy (DOE) researchers for a typical supercritical powerplant (Klett et al., 2007). For comparison, the same design parameters given in the DOE study for the ash washing process were used, although the sulfur content in the DOE study is 44.8 wt. %, which is ~400% higher than the ash used in this study.

TABLE 4

Comparison of water intensity for Wet FGD and SDA followed by sulfur washing

| Process parameter | Units | Value | | |
|---|---|---|---|---|
| A. Power plant design basis | | | | |
| Net power generation | MW | 500 | | |
| Net Plant efficiency | % | 39.9 | | |
| Coal | tonne/day | 3877.5 | | |
| S in coal | wt. % of coal | 4.35 | | |
| Fly ash produced | wt. % of coal | 8.2 | | |
| B. FGD | | Wet FGD | SDA + W1‡ | SDA + W2‡ |
| Fly ash | tonne/day | 316.8 | 1139$ | 1139$ |
| % $SO_3$ in ash* | wt. % | | 44.7 | 44.7 |
| Dry gypsum produced | tonne/day | 1097 | 0 | 0 |
| Water Intensity | L/MWhr | 220 | 140 | 140 |
| C. Washing Process | | | W1 | W2 |
| Liquid-to-solid ratio | mL/g | | 437 | 437 |
| CO2 capture | tonne/day | | 159.1 | 0 |
| Water losses | tonne/day | | 426 | 318 |
| Water intensity | L/MWhr | | 35.5 | 26.5 |
| Gypsum produced | tonne/day | — | 1059 | 1059 |
| D. Overall | | | | |
| Marketable ASTM C618 compliant ash | tonne/day | 316.8 | 344.6 | 344.6 |
| Water Intensity | L/MWhr | 220 | 175.5 | 166.5 |

‡W1, W2 are two- and single-stage washing scenarios, respectively.
*$SO_3$ content in the ash is much higher compared to the ash used in this study. While the washing process may not be ideal for washing such high sulfur ashes, we intend to estimate and compare water intensity with the wet FGD process.
$Sulfur is assumed to be present as calcium sulfite hemihydrate.

Two configurations were explored for the sulfur-washing process shown in FIG. 7B: i) W1—both stage 1 and stage 2 for carbon dioxide capture and washing as described in FIG. 7B, and ii) W2—only stage 2 for sulfur washing without carbon dioxide capture. A comparison of process parameters for wet FGD and sulfur washing processes are shown in Table 4. The washing process produces similar quantities of gypsum as wet FGD in addition to $CO_2$ capture of 159 tonnes/day. The water losses in wet FGD are found to be higher than the two-stage washing process, W1, which in turn is higher than the single-stage process without $CO_2$ capture, W2. Such a decreasing trend in water intensity is due to lower flue gas flow rates (~4.6% of total generated) into the absorption column compared to the wet FGD process where entire flue gas stream is contacted with process water. In the case without $CO_2$ capture, W2, water losses are not expected during absorption stage. A marginal contribution in lowering water intensity for washing processes is due to retention of 5.0 wt. % $SO_3$ in the washed ash.

CONCLUSION

The sulfur extraction from SDA FGD ash is rapid in both alkaline and acidic conditions, as observed in DI water and carbonic acid, respectively. The release of sulfur appears to be limited by the solubility of calcium sulfite hemihydrate. In general, the leachate was observed to be supersaturated with respect to $CaSO_3 \cdot 0.5\ H_2O$ phase, possibly due to the continued release of calcium from other phases and the common-ion effect. The selectivity of sulfur removal is better at lower residence time in the washing reactor, whereby calcium losses can be avoided. The lower solubility of aluminum, iron, and silicon in the acidic conditions reduces the washing losses in sulfuric acid or carbonic acid and shows potential for recovery of gypsum by oxidation of the leachate. The stoichiometric ratio of the acid requirement for S washing was found to be about 1.95 and 1.01 meq/mmole of sulfur released at L/S ratio of 25 mL/g ash without and with recycle, respectively. The net wastewater generation for mineral acid based processes is estimated to be less than 0.5 mL/g of ash. The liquid-to-solid ratio requirement for the FGD ash studied is estimated to be 50 mL/g ash at 5 atm $CO_2$ pressure. The washed ash is shown to be compliant with ASTM C618 for class C SCM's. The gravimetric losses due to washing are estimated to be 15 wt. % of the FGD ash. Thus, up to 85 wt. % of the ash stored in ponds can be beneficially used as SCM. The process is useful for reducing the sulfur content of sulfur-rich coal ashes from flue gas desulfurization by washing them using mineral or carbonic acids. Because the process equipment required is similar to the equipment used in wet FGD and incinerator ash washing processes, the process can be commercialized on a large scale with only minimal capital investment.

REFERENCES CITED

American Road and Transportation Builders Association, 2011. The Economic Impacts of Prohibiting Coal Fly Ash Use in Transportation Infrastructure Construction, Transportation Development Foundation (TDF).
ASTM, 2010. Standard Specification for Coal Fly Ash and Raw or Calcined Natural Pozzolan for Use in Concrete, Annual Book of ASTM Standards. https://doi.org/10.1520/C0618-19.
Atadero, R. A., Riley, C. E., Van De Lindt, J. W., Heyliger, P. R., 2011. Cementitious spray dryer ash-tire fiber material for maximizing waste diversion. Adv. Civ. Eng. 2011. https://doi.org/10.1155/2011/354305
Brogren, C., Karlsson, H. T., 1997. Modeling the absorption of $SO_2$ in a spray scrubber using the penetration theory. Chem. Eng. Sci. 52, 3085-3099. https://doi.org/10.1016/S0009-2509(97)00126-7
Butalia, T., Wolfe, W., Amaya, P., 2017. The utilization of flue-gas desulfurization materials, Coal Combustion Products (CCPs): Characteristics, Utilization and Beneficiation. Elsevier Ltd. https://doi.org/10.1016/B978-0-08-100945-1.00006-X
Carpenter, A. M., 2012. Low water FGD technologies, IEA Clean Coal Center. IEA Clean Coal Centre.
DeVilbiss, J., Ray, S., 2017. Sulfur dioxide emissions from U.S. power plants have fallen faster than coal generation [WWW Document]. EIA. URL https://www.eia.gov/todayinenergy/detail.php?id=29812
Enders, M., 1996. The CaO distribution to mineral phases in a high calcium fly ash from eastern germany. Cem. Concr. Res. 26, 243-251.
Gerard, P., Segantini, G., Vanderschuren, J., 1996. Modeling of dilute sulfur dioxide absorption into calcium sulfite slurries. Chem. Eng. Sci. 51, 3349-3358.
Fuller, E. C., Crist, R. H., 1941. The rate of oxidation of sulfite ions by oxygen. J. Am. Chem. Soc. 63, 1644-1650. https://doi.org/10.1021/ja01851a041.
Harkness, J. S., Sulkin, B., Vengosh, A., 2016. Evidence for Coal Ash Ponds Leaking in the Southeastern United States. Environ. Sci. Technol. 50, 6583-6592. https://doi.org/10.1021/acs.est.6b01727
Hoff, S., DeVilbiss, J., 2016. EIA electricity generator data show power industry response to EPA mercury limits [WWW Document]. URL https://www.eia.gov/todayinenergy/detail.php?id=26972 (accessed 2.21.20).
ICIS, 2018. US sulphuric acid import prices hit six-year highs. ICIS Chem. Bus. 21.
Izquierdo, M., Querol, X., 2012. Leaching behaviour of elements from coal combustion fly ash: An overview. Int. J. Coal Geol. 94, 54-66. https://doi.org/10.1016/j.coal.2011.10.006
Klett, M. G., Kuehn, N. J., Schoff, R. L., Vaysman, V., White, J. S., 2007. Power Plant Water Usage and Loss Study The United States Department of Energy. https://doi.org/10.13140/RG.2.1.5024.6163
Parkhurst, D. L., Appelo, C. A. J., 2013. Description of input and examples for PHREEQC version 3: a computer program for speciation, batch-reaction, one-dimensional transport, and inverse geochemical calculations, Techniques and Methods. Reston, Va. https://doi.org/10.3133/tm6A43
Ríos, A., González, M., Montes, C., Vásquez, J., Arellano, J., 2020. Assessing the effect of fly ash with a high SO3 content in hybrid alkaline fly ash pastes (HAFAPs). Constr. Build. Mater. 238, 117776. https://doi.org/10.1016/j.conbuildmat.2019.117776
Sarudi, I., Varga-Cseresnyés, E., Csapó-Kiss, Z., Szabó, A., 2001. Elimination of disturbing effect caused by sulphur dioxide for sulphur determination in wines by ICP-OES. Anal. Lett. 34, 449-455. https://doi.org/10.1081/AL-100102586
Sharifi, N. P., Jewell, R. B., Duvallet, T., Oberlink, A., Robl, T., Mahboub, K. C., Ladwig, K. J., 2019. The utilization of sulfite-rich Spray Dryer Absorber Material in portland cement concrete. Constr. Build. Mater. 213, 306-312. https://doi.org/10.1016/j.conbuildmat.2019.04.074
Tseng, P. C., Rochelle, G. T., 1986. Dissolution Rate Of Calcium Sulfite. Environ. Prog. 5.

What is claimed is:

1. A method of reducing sulfur concentration in fly ash, flue gas desulfurization (FGD) ash, and mixtures thereof, the method comprising contacting fly ash, FGD ash, or mixtures thereof with an aqueous acidic solution, for a time, at a temperature, and at a liquid-to-solid ratio wherein sulfur concentration within the fly ash, FGD ash, or mixture thereof is reduced to no more than 5 wt % $SO_3$ based on total weight of dry fly ash, FGD ash, or mixture thereof so contacted.

2. The method of claim 1, comprising contacting the fly ash, FGD ash, or mixtures thereof with the aqueous, acidic solution at a liquid-to-solid ratio of no more than 2 liters aqueous, acidic solution per gram of fly ash, FGD ash, or mixture thereof.

3. The method of claim 1, comprising contacting the fly ash, FGD ash, or mixtures thereof with the aqueous, acidic solution at a liquid-to-solid ratio of no more than 1 liter aqueous, acidic solution per gram of fly ash, FGD ash, or mixture thereof.

4. The method of claim 1, comprising contacting the fly ash, FGD ash, or mixtures thereof with the aqueous, acidic solution at a liquid-to-solid ratio of no more than 100 mL aqueous, acidic solution per gram of fly ash, FGD ash, or mixture thereof.

5. The method of claim 1, comprising contacting the fly ash, FGD ash, or mixtures thereof with the aqueous, acidic solution at a liquid-to-solid ratio of no more than 50 mL aqueous, acidic solution per gram of fly ash, FGD ash, or mixture thereof.

6. The method of claim 1, comprising contacting the fly ash, FGD ash, or mixtures thereof with the aqueous, acidic solution at a liquid-to-solid ratio of no more than 25 mL aqueous, acidic solution per gram of fly ash, FGD ash, or mixture thereof.

7. The method claim 1, wherein pH of the aqueous, acidic solution is from about 2.0 to about 6.5.

8. The method claim 1, wherein pH of the aqueous, acidic solution is from about 4.0 to about 6.0.

9. The method claim 1, wherein pH of the aqueous, acidic solution is from about 4.0 to about 5.0.

10. The method of claim 1, wherein the aqueous acidic solution comprises carbonic acid.

11. The method of claim 10, wherein the fly ash, FGD ash, or mixture thereof is contacted with water in the presence of a gas phase comprising a partial pressure of carbon dioxide of from about 0.12 atm to about 10 atm.

12. The method of claim 10, wherein the fly ash, FGD ash, or mixture thereof is contacted with water in the presence of a gas phase comprising a partial pressure of carbon dioxide of from about 1 atm to about 5 atm.

13. The method of claim 1, wherein the aqueous acidic solution comprises a mineral acid.

14. The method of claim 13, wherein the mineral acid is selected from the group consisting of hydrochloric acid (HCl), nitric acid ($HNO_3$), phosphoric acid ($H_3PO_4$), sulfuric acid ($H_2SO_4$), boric acid ($H_3BO_3$), hydrofluoric acid (HF), hydrobromic acid (HBr), and perchloric acid ($HClO_4$).

15. The method of claim 1, wherein the fly ash, FGD ash, or mixture thereof is contacted with the aqueous acidic solution at a liquid-to-solid ratio wherein hydrogen ion concentration ($[H^+]$) in the aqueous acidic solution is at least 1.95 mmol $[H^+]$ per mole of sulfur to be washed.

\* \* \* \* \*